(12) United States Patent
McLaughlin et al.

(10) Patent No.: US 6,808,151 B1
(45) Date of Patent: Oct. 26, 2004

(54) PROTECTING APPARATUS FOR USE WITH TELESCOPING SUPPORT MEMBER

(76) Inventors: John E. McLaughlin, 3 Country La., Lake Grove, NY (US) 11755; Neocles G. Athanasiades, 6 Mayeeck Dr., Setauket, NY (US) 11723; Toh M. Meng, 15 Sunflower Dr., Hauppauge, NY (US) 11788

( * ) Notice: Subject to any disclaimer, the term of this patent is extended or adjusted under 35 U.S.C. 154(b) by 0 days.

(21) Appl. No.: 10/647,179

(22) Filed: Aug. 25, 2003

(51) Int. Cl.[7] .................................. A47B 95/00
(52) U.S. Cl. ...................................... 248/354.1
(58) Field of Search .................. 248/535, 539, 248/541, 534, 519, 314, 315, 218.4, 219.4, 229.25

(56) References Cited

U.S. PATENT DOCUMENTS

| | | | | |
|---|---|---|---|---|
| 694,888 A | * | 3/1902 | Pfluger | 248/514 |
| 2,632,850 A | * | 3/1953 | Anderson | 52/110 |
| 2,941,769 A | * | 6/1960 | Alpard | 248/111 |
| 3,709,556 A | * | 1/1973 | Allard et al. | 297/188.2 |
| 4,042,237 A | * | 8/1977 | Moraru | 473/429 |
| 4,687,168 A | * | 8/1987 | Rupp | 248/539 |
| 4,874,991 A | * | 10/1989 | Ruskin | 315/362 |
| 5,476,241 A | * | 12/1995 | Helman | 248/286.1 |
| 5,961,092 A | * | 10/1999 | Coffield | 248/539 |
| 6,123,306 A | * | 9/2000 | Jackson | 248/296.1 |
| 6,244,557 B1 | * | 6/2001 | Maze | 248/541 |
| 6,375,146 B1 | * | 4/2002 | Painchaud | 248/534 |
| 6,536,733 B1 | * | 3/2003 | Sharp | 248/519 |

* cited by examiner

Primary Examiner—Leslie A. Braun
Assistant Examiner—A. Joseph Wujciak
(74) Attorney, Agent, or Firm—Frank L. Hart

(57) ABSTRACT

A telescopically moveable support member has a work element connected to a first end thereof. A rail and slotted collar arrangement is associated with the support member and bumpers are connected to the work element to prevent damage to both the work element and vehicle to which connected during movement from the extended position to the retracted position.

14 Claims, 2 Drawing Sheets

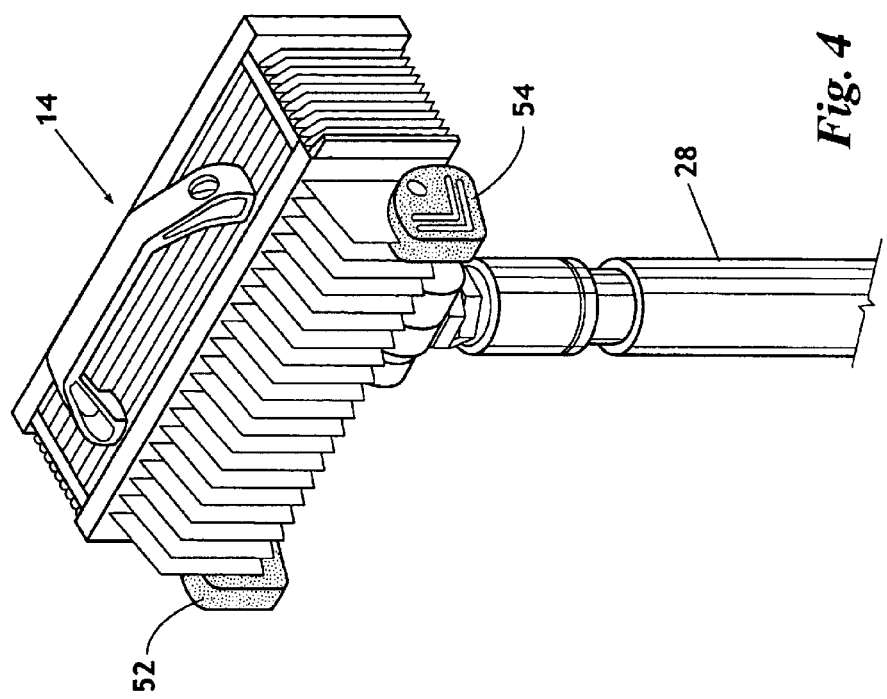
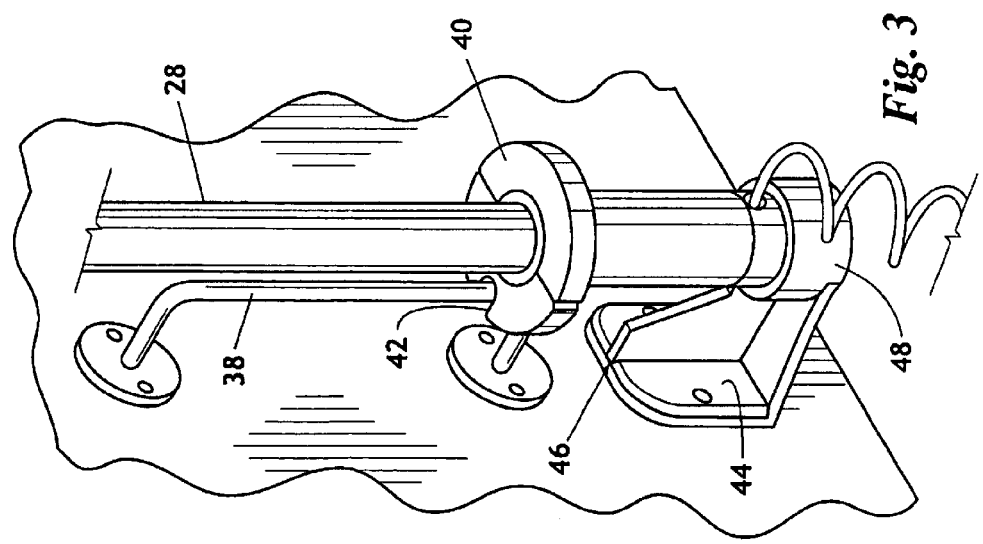

PROTECTING APPARATUS FOR USE WITH TELESCOPING SUPPORT MEMBER

TECHNICAL FIELD

The subject invention relates to protecting apparatus. More particularly, the subject invention relates to apparatus for protecting a work element mounted on a telescopically moveable support member and protecting the vehicle upon which mounted.

BACKGROUND ART

Many work projects have need for a light or camera located at an elevated position. Heretofore, the work vehicle carries a large tri pod which must be assembled from a number of pieces, the work element connected thereto and the constructed assembly positioned. Such system represented a large waste of time and material.

This invention is directed toward providing a structure for positioning a light or camera or other work element at an elevated position and protecting the work element and the vehicle to which it is connectable. In the absence of this invention, the work element and the vehicle to which it is attachable can be dented, scratched or otherwise damaged during operation. The invention is directed to overcome one or more of the heretofore problems.

DISCLOSURE OF THE INVENTION

In one aspect of the invention, a protecting apparatus is provided for use with a support member which has a work element on a first end thereof. The supporting apparatus is connectable to the side of a vehicle.

A support member has first and second end portions, first and second ends, and a middle portion. The support member is telescopically or sidably moveable between an extended and a retracted position.

First and second spaced apart holding members are provided with each have first and second end portions. Each first end portion is connectable to the side of a vehicle with each second end portion being extendable about a respective middle portion of the support member.

A guiding rail is connectable to the side of the vehicle in linear alignment with the support member with said support member positioned within the first and second holding members.

A guide collar is connected to and is moveable with the second end portion of the support member. The guide collar has a slot on a preselected side thereof. The slot is mateable with the guide rail for orienting the support member and work element in the retracted position of the supporting member.

BRIEF DESCRIPTION OF THE DRAWINGS

FIG. 3 is a diagrammatic perspective view of a portion of the invention; and

FIG. 4 is a diagrammatic perspective view of the work element of this invention.

BEST MODE FOR CARRYING OUT THE INVENTION

Figure 1:
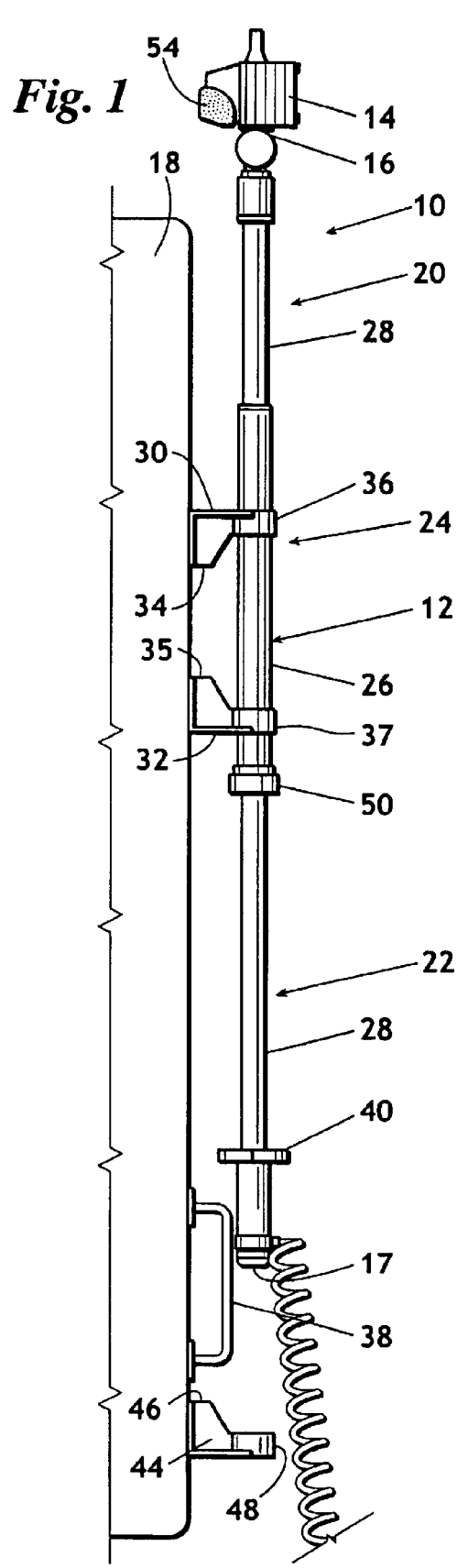
FIG. 1 is a diagrammatic side view of the apparatus of this invention in the extended position.
Figure 2:
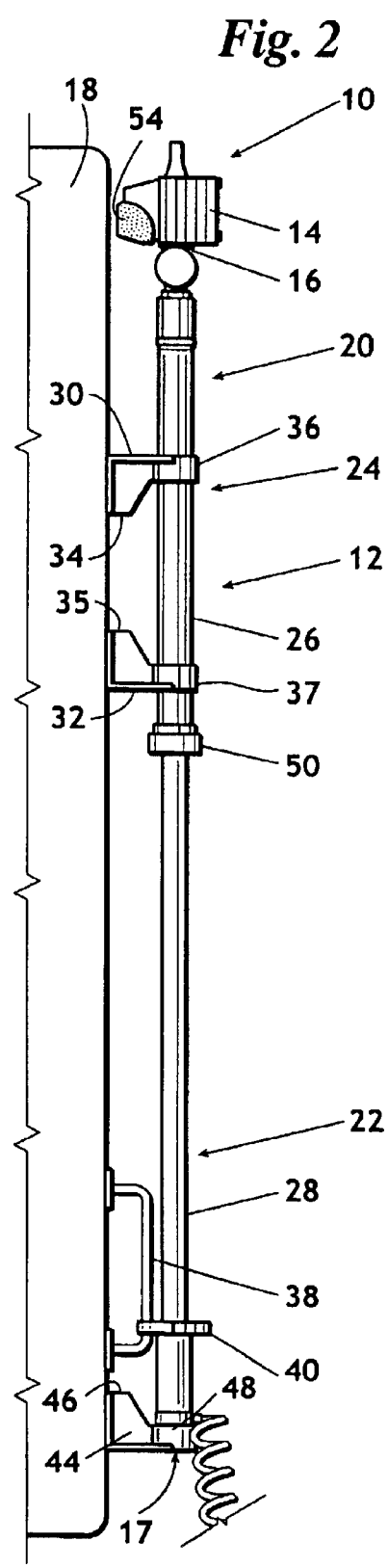
FIG. 2 is a diagrammatic side view of the apparatus of this invention in the retracted position.

Referring to FIGS. 1 and 2, the protecting apparatus of this invention 10 is provided for use with a support member 12 maintaining a work element 14 on a first end 16 thereof. The support member 12 is connectable to the side of a vehicle 18 which is protected from dents and scratches by elements of this invention.

The support member 12 has first and second end portions, first and second ends 16,17 and a middle portion 24. The support member 12 is telescopically moveable between an extended position, as shown in FIG. 1, and a retracted position, as shown in FIG. 2. The support member 12 is formed of first and second elements 26,28 telescopically or slidably moveable relative one to the other.

The first element 26 of the support member 12 is shorter than and is surrounding said second element 28. The first element 26 is releaseably connectable to the associated vehicle 18 as later more fully described. The second member 28 is slidably or telescopically moveable through said first element 26 between extended and retracted positions relative to a side of said vehicle 18.

First and second spaced apart holding members 30,32 are provided. Each holding member 30,32 have respective first end portions 34,35 and second end portions 36,37. Each first end portion 34,35 is connectable to the side of a vehicle 18 with each second end portion 36,37 extending outwardly from the side of the vehicle 18 and about a respective middle portion 24 or first element 26 of the support member 12. The holding members 30,32 maintain the first element 26 of the supporting member 12 at a fixed location relative to the vehicle 18.

A guiding rail 38 is connectable to the side of the vehicle 18 in linear alignment with the support member 12 with said support member 12 positioned within the first and second holding members 30,32.

A guide collar 40 is connected to and moveable with the second end portion 22 of the support member 12. The guide collar 40 has a slot 42 on a preselected side thereof. The slot 42 is mateable with the guide rail 38 for orienting the support member 12 and work element 14 during movement of the work element 14 from the elevated position at which the work element 14 is at a higher elevation than the vehicle 18 to the retracted position at which the work element 14 is adjacent a side of the vehicle 18.

Referring to FIG. 3, a rest bracket 44 has first and second end portions 46,48. The first end portion is connectable to the vehicle 18 with the second end portion in linear alignment and adjacent the second end portion 22 of the support member 12. The second end portion 48 of the rest bracket is preferably of concave configuration and of a size sufficient for receiving a portion of the second end portion 22 of the support member 12 in the retracted position of the support member 12.

The guiding rail 38 is of general "U" configuration and has a length between legs of the "U" in the range of about 6 inches to about 18 inches. More preferably, the length of the "U" and the position of the guiding rail 38 are such that the guide collar slot 42 engages the guiding rail 38 immediately before the work element 14 reaches the elevation of the top of the vehicle 18 during movement toward the retracted position and the slot 42 is in contact with the guiding rail 38 in the fully retracted position. The work element 14 which is connected to the first end of the support member 12 can be a light, camera or other work element.

A holding means 50 is provided for releaseably maintaining the second element 28 of the support member 12 at preselected elevated positions relative to said vehicle 18. The holding means 50 can be aligned holes extending through the first and second elements 26,28 and a pin insertable through the holes, for example. Preferably, the holding means 50 is a friction type holding means connected to said first element 26 of the support member 12.

Referring to FIG. 4, one or more bumpers 52,54 are connected to the work element 14 at a location immediately adjacent the vehicle 18 in the retracted position of the support member 12. The bumpers 52,54 are flexible and formed of rubber or organic plastic or other material to prevent scratching or denting of the vehicle and for protecting the work element 14 against shock from impact. It is preferred that the thickness of the bumpers is substantially the dimension of the distance between the work element 14 and the vehicle 18 in the retracted position of the work element 14.

INDUSTRIAL APPLICABILITY

In the operation of the apparatus of this invention 10 installed on a vehicle 18, the driver positions and parks the vehicle 18 at the desired work site. He first releases the holding means 50 for movement of the second element 28 of the support member 12 along the guiding rail 38 and through the first element 26 of the support member for positioning the work element 14 at an elevated position. As the work element 14 approaches the maximum elevation above the top of the vehicle 18, the guide collar 40 disengages from the guiding rail 38 and permits the rotations of the work element 14 in a desired direction without contacting the vehicle. The holding means 50 is then actuated to maintain the work element 14 so oriented.

Upon completion of work, the holding means 50 is released, the second element 28 of the support member 12 is rotated so that the slot 42 is aligned with the guiding rail 38 and the second element 28 and work element 14 can be retracted without contact of the work element 14 with the vehicle 18. If the slot is not aligned with the guiding rail 38 during retraction, the vehicle 18 and work element 14 are protected from impact one against the other by the guide collar 40 contacting the guide rail and thereby preventing further movement toward the retracted position. At the retracted position, the second end portion 22 of the support member 12 is seated in the rest bracket 44, the holding means 50 is engaged to prevent relative movement between the first and second elements 26,28 of the support member 12 and the work element 14 is located immediately adjacent a side of the vehicle 18.

Other aspects, objects, and advantages of the invention can be obtained from a study of the drawings, the disclosure, and the appended claims.

What is claimed is:

1. A protecting apparatus for use with a support member maintaining a work element on a first end thereof, said support member being connectable to the side of a vehicle, comprising:
   a support member having first and second end portions, first and second ends, a middle portion, and being telescopically or sidably moveable between an extended and a retracted position;
   first and second spaced apart holding members each having first and second end portions, each first end portion adapted to be connected to the side of a vehicle with each second end portion extending about a respective middle portion of the support member;
   a guiding rail adapted to be connected to the side of the vehicle in linear alignment with the support member with said support member positioned within the first and second holding members; and
   a guide collar connected to and moveable with the second end portion of the support member, said guide collar having an outwardly extending slot on a preselected side thereof, said slot being mateable with the guide rail for orienting the support member and work element during movement toward the retracted position of the support member.

2. A protecting apparatus, as set forth in claim 1, including a rest bracket having first and second end portions, said first end portion being connectable to said vehicle with the second end portion in linear alignment and adjacent the second end portion of support member.

3. A protecting apparatus, as set forth in claim 2, wherein the second end portion of the rest bracket is of concave configuration and is of a size sufficient for receiving a portion of the second end portion of the support member in the retracted position of said support member.

4. A protecting apparatus, as set forth in claim 1, wherein the guiding rail is of general "U" configuration.

5. A protecting apparatus, as set forth in claim 4, wherein the guiding rail is of a length in the range of about six to about 18 inches.

6. A protecting apparatus, as set forth in claim 4, including first and second mounting plates each connected to respective leg of the "U" configured guiding rail.

7. A protecting apparatus, as set forth in claim 1, including an electric light connected to the first end of the support member.

8. A protecting apparatus, as set forth in claim 1, including a camera connected to the first end of the supporting member.

9. A protecting apparatus, as set forth in claim 1, wherein the telescoping support member is formed of first and second elements, said first element being shorter than and is surrounding said second element, and being connected to said first and second spaced apart holding members, said second element being telescopically moveable through said first member between an extended and retracted position relative to the side of said vehicle.

10. A protecting apparatus, as set forth in claim 1, including a holding means for releaseably maintaining the second element of the support member at preselected positions relative to said vehicle.

11. A protecting apparatus, as set forth in claim 10, wherein said holding means is a friction type holding means connected to said first support element.

12. A protecting apparatus, as set forth in claim 1, wherein the work element is mounted on the first end of the support member and has flexible protecting bumpers adapted to be adjacent the vehicle to which is it adapted to be connected.

13. A protecting apparatus, as set forth in claim 12, wherein the bumpers are formed of rubber or organic plastic.

14. A protecting apparatus, as set forth in claim 12, wherein the thickness of the bumpers is substantially the dimension of the distance between the work element and the vehicle in the retracted position of the work element.

* * * * *